(12) United States Patent
Yamaguchi et al.

(10) Patent No.: US 8,544,619 B2
(45) Date of Patent: Oct. 1, 2013

(54) FLUID PRESSURE SHOCK ABSORBER

(75) Inventors: Hiroyuki Yamaguchi, Tokyo (JP); Yohei Katayama, Kawasaki (JP); Hiroyuki Hayama, Yokohama (JP); Takashi Nezu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1137 days.

(21) Appl. No.: 12/078,150

(22) Filed: Mar. 27, 2008

(65) Prior Publication Data
US 2008/0257668 A1 Oct. 23, 2008

(30) Foreign Application Priority Data
Apr. 19, 2007 (JP) ................... 2007-111048

(51) Int. Cl.
*F16F 9/48* (2006.01)
(52) U.S. Cl.
USPC ..... 188/285; 188/266.6; 188/280; 188/282.1; 188/282.2; 188/282.5; 188/282.6; 188/313; 188/317; 188/322.13; 188/322.15
(58) Field of Classification Search
USPC ......... 188/322.13, 285, 282.1–282.3, 322.15, 188/322.22, 266.5, 282.5, 313, 316, 317
See application file for complete search history.

(56) References Cited

U.S. PATENT DOCUMENTS

| | | | |
|---|---|---|---|
| 4,953,671 A | 9/1990 | Imaizumi | |
| 5,823,306 A * | 10/1998 | de Molina | 188/322.15 |
| 7,694,785 B2 | 4/2010 | Nakadate | |
| 2001/0010279 A1 * | 8/2001 | Matsumoto et al. | 188/280 |
| 2003/0098209 A1 * | 5/2003 | Nakadate | 188/282.5 |
| 2005/0279597 A1 * | 12/2005 | Yamaguchi | 188/322.13 |

FOREIGN PATENT DOCUMENTS

| | | |
|---|---|---|
| JP | 2-51637 | 2/1990 |
| JP | 2000-179607 | 6/2000 |

(Continued)

OTHER PUBLICATIONS

Japanese Office Action (with English translation) issued May 11, 2011 in corresponding Japanese Patent Application No. 2007-111048.

(Continued)

*Primary Examiner* — Robert A Siconolfi
*Assistant Examiner* — San Aung
(74) *Attorney, Agent, or Firm* — Wenderoth, Lind & Ponack, LLP (57) ABSTRACT

A fluid pressure shock absorber in which valve opening of the main valve is controlled by an inner pressure of a backpressure chamber. A first piston (3) and a second piston (4) coupled to a piston rod (10) are fitted in a cylinder (2) such that a piston chamber (2C) is defined between the first and second pistons. An extension-side main valve (18) and a compression-side main valve (23) are provided in the piston chamber (2C). Valve opening of the main valves is controlled by an extension-side backpressure chamber (19) and a compression-side backpressure chamber (24). A compression-side check valve (13) and an extension-side check valve (16) are provided at the first piston (3) and the second piston (4). During an extension stroke of the piston rod (10), the compression-side check valve (13) is closed, whereby action of a pressure of a cylinder upper chamber (2A) on the compression-side main valve (23) is prevented. During a compression stroke of the piston rod (10), the extension-side check valve (16) is closed, whereby action of a pressure of a cylinder lower chamber (2B) on the extension-side main valve (18) is prevented. Accordingly, it is possible to generate a stable damping force, and enhance durability of the extension-side main valve (18) and the compression-side main valve (23).

22 Claims, 3 Drawing Sheets (56) References Cited

FOREIGN PATENT DOCUMENTS

| | | |
|---|---|---|
| JP | 2004-257507 | 9/2004 |
| JP | 2005-344911 | 12/2005 |
| JP | 2006-292092 | 10/2006 |

OTHER PUBLICATIONS

Japanese Office Action (with English translation) mailed May 11, 2011 in corresponding Japanese Patent Application No. 2007-111048.

* cited by examiner

FLUID PRESSURE SHOCK ABSORBER

BACKGROUND OF THE INVENTION

The present invention relates to a fluid pressure shock absorber such as a hydraulic shock absorber mounted on a suspension apparatus of a vehicle such as an automobile. In particular, the present invention relates to a fluid pressure shock absorber including a backpressure chamber for controlling a valve-opening pressure of a main valve which generates a damping force.

Generally, a cylindrical hydraulic shock absorber mounted on a suspension apparatus of a vehicle such as an automobile comprises a sealed cylinder in which oil is contained, a piston rod, a piston coupled to the piston rod and slidably fitted in the cylinder, and a damping force generating mechanism provided at a piston portion, the damping force generating mechanism comprising an orifice, a disk valve and the like. In the hydraulic shock absorber configured as above, an extension or compression movement of the piston rod causes a sliding movement of the piston in the cylinder which in turn causes an oil flow, and a damping force is generated by controlling the thus-caused oil flow with use of the orifice and the disk valve. In a low piston speed range, a damping force of orifice characteristics is generated by the orifice, and in a high piston speed range, a damping force of valve characteristics is generated by the disk valve that is bent and opened.

This conventional hydraulic shock absorber has a disadvantage in that it is difficult to flexibly set damping force characteristics because in a low piston speed range a damping force depends on an area of an orifice flow passage and in the high piston speed range a damping force depends on a predetermined valve-opening pressure of the disk valve; that is, a sufficiently large damping force cannot be obtained in the high piston speed range if damping force characteristics is arranged such that a small damping force is obtained in the low piston speed range, and a damping force becomes excessively large in the low piston speed range if damping force characteristics are arranged such that a large damping force is obtained in the high piston speed range.

As an improved art, for example, Japanese Patent Application Public Disclosure No. 2005-344911 discloses a hydraulic shock absorber comprising backpressure chambers provided on back surface sides of disk valves. In this hydraulic shock absorber, an amount part of oil is introduced in the backpressure chamber so that a pressure of the backpressure chamber acts on the disk valve in a valve-closing direction of the disk valve. A valve-opening pressure of the disk valve is controlled by this mechanism, whereby it is possible to improve flexibility in setting damping force characteristics.

The hydraulic shock absorber disclosed in Japanese Patent Application Public Disclosure No. 2005-344911 further comprises check valves through which the extension-side and compression-side backpressure chambers are respectively in communication with cylinder chambers on downstream sides of the backpressure chambers. During an extension stroke of a piston rod, an increased pressure of the cylinder chamber is introduced into the compression-side backpressure chamber through the check valve, thereby preventing valve opening of the compression-side main valve. During a compression stroke of the piston rod, an increased pressure of the cylinder chamber is introduced into the extension-side backpressure chamber through the check valve, thereby preventing valve opening of the extension-side main valve. Accordingly, it is possible to generate a stable damping force.

SUMMARY OF THE INVENTION

However, the hydraulic shock absorber disclosed in Japanese Patent Application Public Disclosure No. 2005-344911 remains subject to the following problems. Namely, because it is not possible to adequately increase a pressure in the backpressure chamber by a pressure introduced through the check valve when the piston is in an ultra low speed range, it is difficult to securely prevent the main valve from being opened, whereby a damping force is liable to become unstable. In addition, the extension-side and compression-side backpressure chambers are pressurized during both of extension and compression strokes, with the consequence that loads are repeatedly applied to the main valves, whereby durability of the main valves deteriorates.

The present invention has been contrived in consideration of the above-mentioned circumstances, and an object thereof is to provide a fluid pressure shock absorber in which it is possible to generate a stable damping force and improve durability of the shock absorber.

In order to achieve the foregoing and other objects, the present invention provides a fluid pressure shock absorber comprising: a cylinder in which a fluid is sealingly contained; a piston slidably fitted in the cylinder; a piston rod having one end coupled to the piston and the other end extending to an outside of the cylinder; an extension-side main valve for generating a damping force by controlling a fluid flow caused by a sliding movement of the piston during an extension stroke of the piston rod; an extension-side backpressure chamber containing an inner pressure which acts on the extension-side main valve in a valve-closing direction of the extension-side main valve; a compression-side main valve for generating a damping force by controlling a fluid flow caused by a sliding movement of the piston during a compression stroke of the piston rod; and a compression-side backpressure chamber containing an inner pressure which acts on the compression-side main valve in a valve-closing direction of the compression-side main valve. In the fluid pressure shock absorber, parts of the fluid flows are introduced into the extension-side backpressure chamber and the compression-side backpressure chamber, and opening of the extension-side main valve and the compression-side main valve is controlled by utilizing the inner pressures of the extension-side backpressure chamber and the compression-side backpressure chamber. The fluid pressure shock absorber further comprises an extension-side check valve disposed on a downstream side of the extension-side main valve, and a compression-side check valve disposed on a downstream side of the compression-side main valve. In the fluid pressure shock absorber, no accumulator is connected either between the extension-side main valve and the extension-side check valve or between the compression-side main valve and the compression-side check valve.

Preferably, a first section between the extension-side main valve and the extension-side check valve and a second section between the compression-side main valve and the compression-side check valve are in communication with each other.

The fluid pressure shock absorber may further comprise a damping force adjuster which adjusts a damping force by controlling a fluid introduced or being introduced into at least one of the extension-side backpressure chamber and the compression-side backpressure chamber.

The damping force adjuster may comprise a pressure control valve for adjusting a pressure in at least one of the extension-side backpressure chamber and the compression-side backpressure chamber.

At least one of the extension-side main valve and the compression-side main valve may comprise a disk valve.

A plastic packing for sealing the extension-side backpressure chamber or the compression-side backpressure chamber may be fixedly attached to the disk valve.

The piston may comprise two pistons fixed to the piston rod and defining a piston chamber therebetween, and the extension-side main valve and the compression-side main valve may be disposed in the piston chamber, and the extension-side check valve and the compression-side check valve may be provided at the two pistons, respectively.

The extension-side backpressure chamber and the compression-side backpressure chamber may be in communication with each other.

Pressure-receiving areas of the extension-side backpressure chamber and the compression-side backpressure chamber may be different from each other.

The fluid pressure shock absorber may further comprise a valve member defining the extension-side backpressure chamber and the compression-side backpressure chamber between the two pistons.

An initial load may be set to at least one of the extension-side check valve and the compression-side check valve.

DETAILED DESCRIPTION OF THE PREFERRED EMBODIMENT

Hereinafter, embodiments of the present invention will be described in detail with reference to the accompanying drawings.

Figure 1:
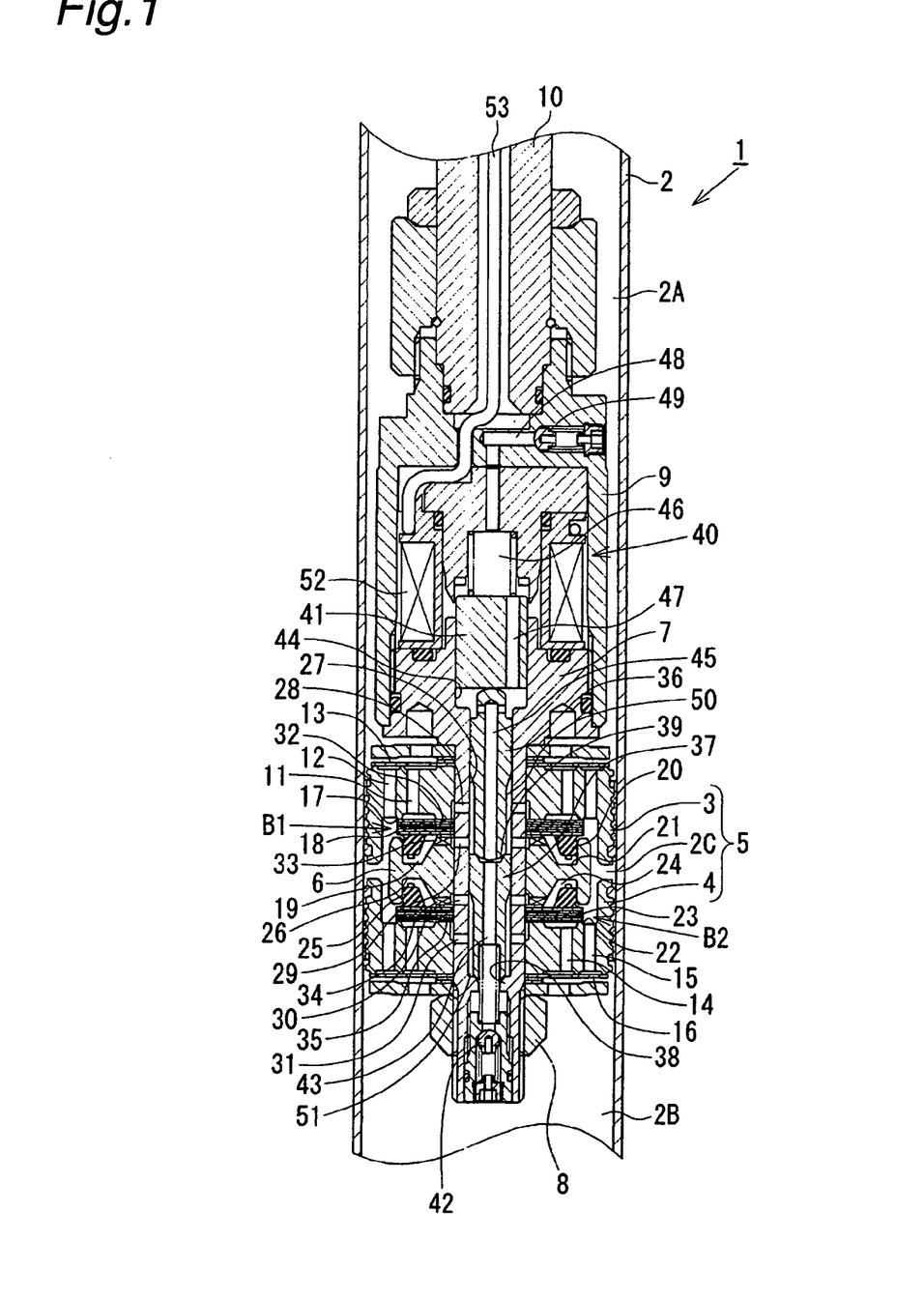
FIG. 1 is a vertical sectional view illustrating main parts of a damping force adjustable hydraulic shock absorber of a first embodiment of the present invention.

FIG. 1 illustrates a first embodiment of the present invention. As shown in FIG. 1, a damping force adjustable hydraulic shock absorber 1 (fluid pressure shock absorber) of the first embodiment is a cylindrical hydraulic shock absorber including a cylinder 2. A piston 5 comprising a first piston 3 and a second piston 4 is slidably fitted in the cylinder 2. The inside of the cylinder 2 is divided by the piston 5 into two chambers, i.e., a cylinder upper chamber 2A and a cylinder lower chamber 2B. Further, a piston chamber 2C is defined between the first piston 3 and the second piston 4. A distal end of a hollow piston bolt 7 is inserted through the first and second pistons 3 and 4, and a valve member 6 sandwiched between the pistons 3 and 4. The pistons 3 and 4, and the valve member 6 are integrally fixed to the distal end of the piston bolt 7 by a nut 8. A case 9 having a substantially bottomed cylindrical form is attached to a proximal end of the piston bolt 7 (upper portion of the piston bolt 7 in FIG. 1). One end of a piston rod 10 is coupled to a bottom of the case 9. The other end of the piston rod 10 is slidably and liquid-tightly inserted through a rod guide (not shown) and an oil seal (not shown) which are attached to an upper end of the cylinder 2, and extends to the outside of the cylinder 2.

A reservoir (accumulator) is connected to a lower end of the cylinder 2 through a base valve (not shown). Oil (fluid) is sealed inside the cylinder 2, and oil and a gas are sealed in the reservoir. In some embodiments, a free piston may be slidably fitted on a bottom side of the cylinder 2 so as to define a gas chamber, and a high-pressure gas may be sealed in the gas chamber.

The first piston 3 includes an extension-side oil passage 11 provided on an inner circumferential side of the piston 3 and a piston oil passage 12 provided on an outer circumferential side of the piston 3. The cylinder upper chamber 2A and the piston camber 2C are in communication with each other through the extension-side oil passage 11 and the piston oil passage 12. An extension-side damping valve B1 for controlling an oil flow passing through the extension-side oil passage 11 is provided at a lower end of the first piston 3. A compression-side check valve 13 is provided at an upper end of the first piston 3. The compression-side check valve 13 allows only an oil flow from the piston chamber 2C side to the cylinder upper chamber 2A side of the piston oil passage 12. The second piston 4 includes a compression-side oil passage 14 provided on an inner circumferential side of the piston 4 and a piston oil passage 15 provided on an outer circumferential side of the piston 4. The cylinder lower chamber 2B and the piston camber 2C are in communication with each other through the compression-side oil passage 14 and the piston oil passage 15. A compression-side damping valve B2 for controlling an oil flow passing through the compression-side oil passage 14 is provided at an upper end of the second piston 4. An extension-side check valve 16 is provided at a lower end of the second piston 4. The extension-side check valve 16 allows only an oil flow from the piston chamber 2C side to the cylinder lower chamber 2B side of the piston oil passage 15.

Holes through which the extension-side oil passage 11 and the cylinder upper chamber 2A are in constant communication are provided at a position of the compression-side check valve 13 facing the extension-side oil passage 11. Likewise, holes through which the compression-side oil passage 14 and the cylinder lower chamber 2B are in constant communication are provided at a position of the extension-side check valve 16 facing the compression-side oil passage 14.

The extension-side damping valve B1 comprises an extension-side main valve 18 (disk valve) and an extension-side backpressure chamber 19. The extension-side main valve 18 is seated on an annular seat portion 17 formed on a lower end surface of the first piston 3. The extension-side backpressure chamber 19 is defined at the back of the extension-side main valve 18 by the valve member 6. The extension-side main valve 18 is bent to be opened when receiving a certain pressure of oil in the extension-side oil passage 11 (cylinder upper chamber 2A). The extension-side check valve 16 provided at the second piston 4 is positioned on a downstream side of the extension-side main valve 18. As mentioned above, it is the lower end of the cylinder 2 at which a reservoir or a gas chamber are connected, and an accumulator such as a reservoir is not connected between the extension-side main valve 18 and the extension-side check valve 16 which is positioned on the downstream side of the main valve 18. An annular plastic packing 20 fixedly attached to the back surface of the extension-side main valve 18 is slidably and liquid-tightly fitted in an outer circumferential portion of an annular groove 21 provided at an upper end of the valve member 6, whereby the extension-side backpressure chamber 19 is defined therein. An inner pressure of the extension-side backpressure chamber 19 acts on the extension-side main valve 18 in a valve-closing direction of the main valve 18.

The compression-side damping valve B2 comprises a compression-side main valve 23 (disk valve) and a compression-side backpressure chamber 24. The compression-side main valve 23 is seated on an annular seat portion 22 formed on an upper end surface of the second piston 4. The compression-side backpressure chamber 24 is defined at the back of the compression-side main valve 23 by the valve member 6. The compression-side main valve 23 is bent to be opened when receiving a certain pressure of oil in the compression-side oil passage 14 (cylinder lower chamber 2B). The compression-side check valve 13 provided at the first piston 3 is positioned on a downstream side of the compression-side main valve 23. As mentioned above, it is the lower end of the cylinder 2 at which a reservoir and a gas chamber are connected, and an accumulator such as a reservoir is not connected between the compression-side main valve 23 and the compression-side check valve 13 which is positioned on the downstream side of the main valve 23. An annular plastic packing 25 fixedly attached to the back surface of the compression-side main valve 23 is slidably and liquid-tightly fitted in an outer circumferential portion of an annular groove 26 provided at a lower end of the valve member 6, whereby the compression-side backpressure chamber 24 is defined therein. An inner pressure of the compression-side backpressure chamber 24 acts on the compression-side main valve 23 in a valve-closing direction of the main valve 23.

The hollow piston bolt 7 includes a guide bore 27 extending along an axis of the piston bolt 7, and ports 28, 29, 30 and 31 radially extending through a side wall of the piston bolt 7. The ports 28, 29, 30 and 31 are in communication with the guide bore 27. In addition, the port 28 is in communication with the extension-side oil passage 11 through an orifice oil passage 32 provided at the first piston 3. The port 29 is in communication with the extension-side backpressure chamber 19 through an oil passage 33 provided at the valve member 6. The port 30 is in communication with the compression-side backpressure chamber 24 through an oil passage 34 provided at the valve member 6. The port 31 is in communication with the compression-side oil passage 14 through an orifice oil passage 35 provided at the second piston 4.

An extension-side valve body 36 (damping force adjuster) facing the ports 28 and 29, and a compression-side valve body 37 (damping force adjuster) facing the ports 30 and 31 are slidably fitted in the guide bore 27 of the piston bolt 7. An annular seat portion 38, on which a front end of the compression-side valve body 37 is seated, is formed in a front end of the guide bore 27. An annular seat portion 39, on which a front end of the extension-side valve body 36 is seated, is formed at a back end of the compression-side valve body 37. A solenoid actuator 40 is disposed in the case 9. A plunger 41 of the solenoid actuator 40 abuts against a back end of the extension-side valve body 36.

A check valve 42, which allows only an oil flow from the guide bore 27 to the cylinder lower chamber 2B, is provided at the front end of the piston bolt 7. The compression-side valve body 37 includes a communication passage 43 axially extending through the valve body 37. The extension-side valve body 36 includes a communication passage 45. The communication passage 45 extends through an axis of the valve body 36, being in communication with the communication passage 43 of the compression-side valve body 37 at its one end, and in communication, at its other end, with a plunger bore 44 which guides the plunger 41. The plunger 41 includes an oil passage 47 axially extending through the plunger 41 so as to establish communication between the plunger bore 44 and a chamber 46 inside the case 9. An oil passage 48 and a check valve 49 are provided at a bottom of the case 9. The chamber 46 and the cylinder upper chamber 2A are in communication with each other through the oil passage 48. The check valve 49 allows only an oil flow from the chamber 46 side to the cylinder upper chamber 2A side of the oil passage 48.

While the back end side of the extension-side valve body 36 is configured to be fitted in the guide bore 27, the front end side thereof has a smaller diameter than that of the back end side, whereby an annular chamber 50 in communication with the ports 28 and 29 is defined between the valve body 36 and the side wall of the guide bore 27, and a pressure receiving surface which receives a pressure of the annular chamber 50 is formed on the front end side of the valve body 36. When the front end of the extension-side valve body 36 moves away from or is seated on the annular seat portion 39 of the compression-side valve body 37, communication between the annular chamber 50 and the communication passage 45 of the extension-side valve body 36, and communication between the chamber 50 and the communication passage 43 of the compression-side valve body 37 are established or cut off (opened or closed).

While the back end side of the compression-side valve body 37 is configured to be fitted in the guide bore 27, the front end side thereof has a smaller diameter than that of the back end side, whereby an annular chamber 51 in communication with the ports 30 and 31 is defined between the valve body 37 and the side wall of the guide bore 27, and a pressure receiving surface which receives a pressure of the annular chamber 51 is formed on the front end side of the valve body 37. When the front end of the compression-side valve body 37 moves away from or is seated on the annular seat portion 38 of the guide bore 27, communication between the annular chamber 51 and the front end of the guide bore 27 where the check valve 42 is provided, and communication between the chamber 51 and the communication passage 43 of the compression-side valve body 37 are established or cut off (opened or closed).

The solenoid actuator 40 generates a thrust force acting on the plunger 41 in accordance with a current applied to a coil 52, and pushes the extension-side and compression-side valve bodies 36 and 37 toward the annular seat portions 38 and 39 sides, thereby adjusting valve-opening pressures of these valves. A lead wire 53 for applying a current to the coil 52 is inserted through the hollow piston rod 10, extending to the outside of the cylinder.

Next, an operation of the first embodiment configured as described above will be discussed.

During an extension stroke of the piston rod 10, until the extension-side main valve 18 is opened, oil of the cylinder upper chamber 2A side flows through the extension-side oil passage 11, the orifice oil passage 32, the port 28 and the annular chamber 50, opens the extension-side valve body 36, and then flows through the communication passage 43 and the check valve 42 into the cylinder lower chamber 2B. At this time, a pressure of the annular chamber 50 is introduced into the extension-side backpressure chamber 19 through the port 29 and the oil passage 33. Once the pressure of the cylinder upper chamber 2A side reaches a valve-opening pressure of the extension-side main valve 18, the main valve 18 is opened and then the oil of the extension-side oil passage 11 starts to flow through the piston chamber 2C and the oil passage 15 of the second piston 4, and opens the extension-side check valve 16 to flow into the cylinder lower chamber 2B. It should be noted that, during the above-mentioned extension stroke, a change in volume inside the cylinder 2 due to exit of the piston rod 10 from the cylinder 2 is compensated for by expansion of the gas in the reservoir or the gas chamber.

Controlling a current to be applied to the coil 52 of the solenoid actuator 40 enables adjustment of the valve-opening pressure of the extension-side valve body 36. This adjustment enables direct control of an oil flow from the annular chamber 50 to the communication passage 43, whereby it becomes possible to adjust the damping force. At the same time, since controlling an oil flow from the chamber 50 to the passage 43 enables adjustment of a pressure of oil introduced from the annular chamber 50 to the extension-side backpressure chamber 19, it becomes possible to control the valve-opening pressure of the extension-side main valve 18.

During a compression stroke of the piston rod 10, until the compression-side main valve 23 is opened, oil of the cylinder lower chamber 2B side flows through the compression-side oil passage 14, the orifice oil passage 35, the port 31 and the annular chamber 51, opens the compression-side valve body 37, and then flows through the communication passage 43, the communication passage 45, the plunger bore 44, the oil passage 47 of the plunger 41, the oil chamber 46, the oil passage 48 and the check valve 49 into the cylinder upper chamber 2A. At this time, a pressure of the annular chamber 51 is introduced into the compression-side backpressure chamber 24 through the port 30 and the oil passage 34. Once the pressure of the cylinder lower chamber 2B side reaches a valve-opening pressure of the compression-side main valve 23, the main valve 23 is opened and then the oil in the compression-side oil passage 14 starts to flow through the piston chamber 2C and the piston oil passage 12 of the first piston 3, and opens the compression-side check valve 13 to flow into the cylinder upper chamber 2A. It should be noted that, during the above-mentioned compression stroke, a change in volume inside the cylinder 2 due to entry of the piston rod 10 into the cylinder 2 is compensated for by compression of the gas in the reservoir or the gas chamber.

Controlling a current to be applied to the coil 52 of the solenoid actuator 40 enables adjustment of the valve-opening pressure of the compression-side valve body 37. This adjustment enables direct control of an oil flow from the annular chamber 51 to the compression passage 43, whereby it becomes possible to adjust the damping force. At the same time, since controlling the oil flow from the chamber 51 to the passage 43 enables adjustment of a pressure of oil introduced from the annular chamber 51 to the compression-side backpressure chamber 24, it becomes possible to control the valve-opening pressure of the compression-side main valve 23.

In this way, it is possible to adjust the valve-opening pressures of the extension-side and compression-side valve bodies 36 and 37 by use of the common solenoid actuator 40, and at the same time, it is possible to adjust the valve-opening pressures of the extension-side and compression-side main valves 18 and 23 by utilizing the inner pressures of the extension-side and compression-side backpressure chambers 19 and 24. As a result, it becomes possible to realize a simple structure while increasing an adjustable range of damping forces.

Because the compression-side check valve 13 is positioned on the downstream side of the compression-side main valve 23, and the compression-side check valve 13 is closed during an extension stroke of the piston rod 10, an increased pressure of the cylinder upper chamber 2A does not act on the compression-side main valve 23. Therefore, it is unlikely, regardless of a pressure of the compression-side backpressure chamber 24, that the compression-side main valve 23 will open or the plastic packing 25 will bend under an influence of an increased pressure of the cylinder upper chamber 2A, which would otherwise result in oil being introduced into the compression-side backpressure chamber 24. As a result, a stable damping force can be generated during an extension stroke regardless of a piston speed.

Similarly, because the extension-side check valve 16 is positioned on the downstream side of the extension-side main valve 18, and the expression-side check valve 16 is closed during a compression stroke of the piston rod 10, a pressure of the cylinder lower chamber 2B does not act on the extension-side main valve 18. Therefore, it is unlikely, regardless of a pressure of the extension-side backpressure chamber 19, that the extension-side main valve 18 will open or the plastic packing 20 will bend under an influence of an increased pressure of the cylinder lower chamber 2B, which would otherwise result in oil being introduced into the extension-side backpressure chamber 19. As a result, a stable damping force can be generated during a compression stroke regardless of a piston speed.

In addition, since the extension-side and the compression-side backpressure chambers 19 and 24 are pressurized only during their respective strokes, durability of the extension-side and compression-side main valves 18 and 23 can be enhanced as compared to the above-mentioned known hydraulic shock absorber disclosed in Japanese Patent Application Public Disclosure No. 2005-344911.

Next, a second embodiment of the present invention will be described with reference to FIG. 2. Elements corresponding to the elements in the above-discussed first embodiment will be denoted by the same reference numerals as those in the first embodiment, and descriptions thereof will not be made in further detail except for elements and features that are different or absent from the first embodiment.

Figure 2:
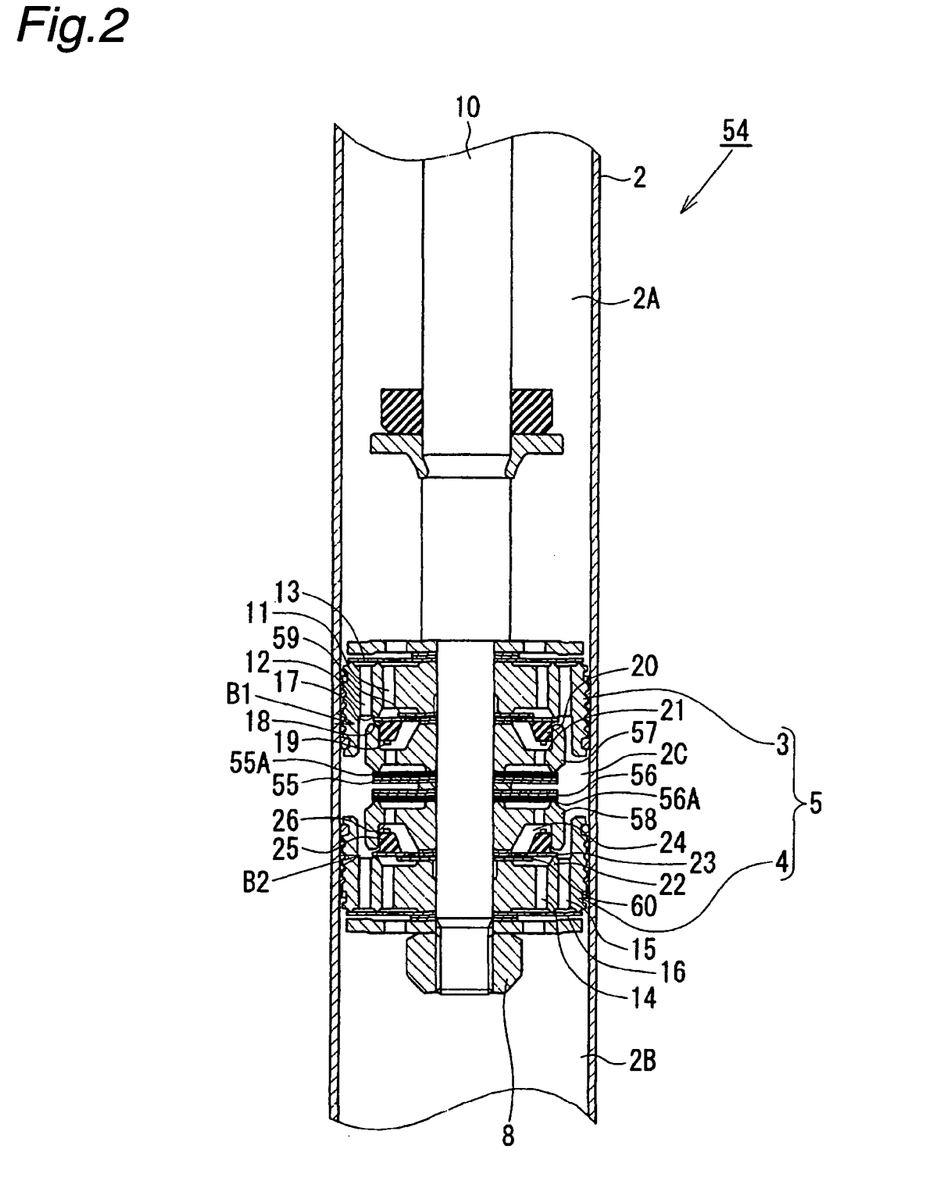
FIG. 2 is a vertical sectional view illustrating main parts of a hydraulic shock absorber of a second embodiment of the present invention.

As shown in FIG. 2, in a hydraulic shock absorber 54 of the second embodiment, the piston bolt 7, the case 9, and the damping force adjuster comprising the extension-side and the compression-side valve bodies 36 and 37 and the solenoid actuator 40 in the first embodiment are replaced with an extension-side backpressure control valve 55 and a compression-side backpressure control valve 56 which respectively control inner pressures of an extension-side backpressure chamber 19 and a compression-side backpressure chamber 24. Furthermore, two valve members, i.e., a first valve member 57 and a second valve member 58 are provided, and the extension-side and compression-side backpressure chambers 19 and 24 are defined by the first and second valve members 57 and 58, respectively. First and second pistons 3 and 4, and the first and second valve members 57 and 58 are directly coupled to a piston rod 10.

The extension-side backpressure chamber 19 is in communication with an extension-side oil passage 11 through an orifice oil passage 59 provided at an extension-side main valve 18, and is also in communication with a piston cylinder 2C through the extension-side backpressure control valve 55. The extension-side backpressure control valve 55 is a disk valve including an orifice 55A (cutout) through which the extension-side backpressure chamber 19 and the piston chamber 2C are in constant communication with each other. When a pressure of the extension-side backpressure chamber 19 reaches a predetermined pressure, the extension-side backpressure control valve 55 is opened, whereby the pressure is released into the piston chamber 2C.

The compression-side backpressure chamber 24 is in communication with a compression-side oil passage 14 through an orifice oil passage 60 provided at a compression-side main valve 23, and is also in communication with the piston cylinder 2C through the compression-side backpressure control valve 56. The compression-side backpressure control valve 56 is a disk valve including an orifice 56A (cutout) through which the compression-side backpressure chamber 24 and the piston chamber 2C are in constant communication with each other. When a pressure of the compression-side backpressure chamber 24 reaches a predetermined pressure, the compression-side backpressure control valve 56 is opened, whereby the pressure is released into the piston chamber 2C.

The hydraulic shock absorber 54 configured as discussed above works as follows. During an extension stroke of the piston rod 10, until the extension-side main valve 18 is opened, oil of a cylinder upper chamber 2A side flows through the extension-side oil passage 11, the orifice oil passage 59 of the extension-side main valve 18, the extension-side backpressure chamber 19, the orifice 55A of the extension-side backpressure control valve 55, the piston chamber 2C, and a piston oil passage 15 of the second piston 4, opens an extension-side check valve 16, and then flows into a cylinder lower chamber 2B. A damping force is mainly generated by the orifice passage 59 and the orifice 55A. Once the extension-side main valve 18 is opened, the oil starts to flow from the extension-side oil passage 11 to the piston chamber 2C directly, and a damping force is generated according to an opening degree of the main valve 18. At this time, a valve-opening pressure of the extension-side main valve 18 is adjusted by an inner pressure of the extension-side backpressure chamber 19. Once a pressure of the extension-side backpressure chamber 19 reaches a predetermined pressure, the extension-side backpressure control valve 55 is opened, and the pressure is released into the piston chamber 2C, thereby preventing an excessive increase in the valve-opening pressure of the extension-side main valve 18.

During a compression stroke of the piston rod 10, until the compression-side main valve 23 is opened, oil of the cylinder lower chamber 2B side flows through the compression-side oil passage 14, the orifice oil passage 60 of the compression-side main valve 23, the compression-side backpressure chamber 24, the orifice 56A of the compression-side backpressure control valve 56, the piston chamber 2C, and a piston oil passage 12 of the first piston 3, opens a compression-side check valve 13, and then flows into the cylinder upper chamber 2A. A damping force is mainly generated by the orifice passage 60 and the orifice 56A. Once the compression-side main valve 23 is opened, the oil starts to flow from the compression-side oil passage 14 to the piston chamber 2C directly, and a damping force is generated according to an opening degree of the main valve 23. At this time, a valve-opening pressure of the compression-side main valve 23 is adjusted by an inner pressure of the compression-side backpressure chamber 24. Once a pressure of the compression-side backpressure chamber 24 reaches a predetermined pressure, the compression-side backpressure control valve 56 is opened, and the pressure is released into the piston chamber 2C, thereby preventing an excessive increase in the valve-opening pressure of the compression-side main valve 23.

Similarly to the prior-discussed first embodiment, because the extension-side and compression-side check valves 16 and 13 are respectively positioned on downstream sides of the extension-side and compression-side main valves 18 and 23, the compression-side check valve 13 prevents an increased pressure of the cylinder upper chamber 2A side from acting on the compression-side main valve 23 during an extension stroke of the piston rod 10, and the extension-side check valve 16 prevents an increased pressure of the cylinder lower chamber 2B side from acting on the extension-side main valve 18 during a compression stroke of the piston rod 10. Therefore, regardless of a piston speed, it is possible to generate a stable damping force and enhance durability of the extension-side and compression-side main valves.

Next, a third embodiment of the present invention will be described with reference to FIG. 3. Elements corresponding to the elements in the before-discussed first embodiment will be denoted by the same reference numerals as those in the first embodiment, and descriptions thereof will not be made in further detail except for elements and features that are different or absent from in the first embodiment.

Figure 3:
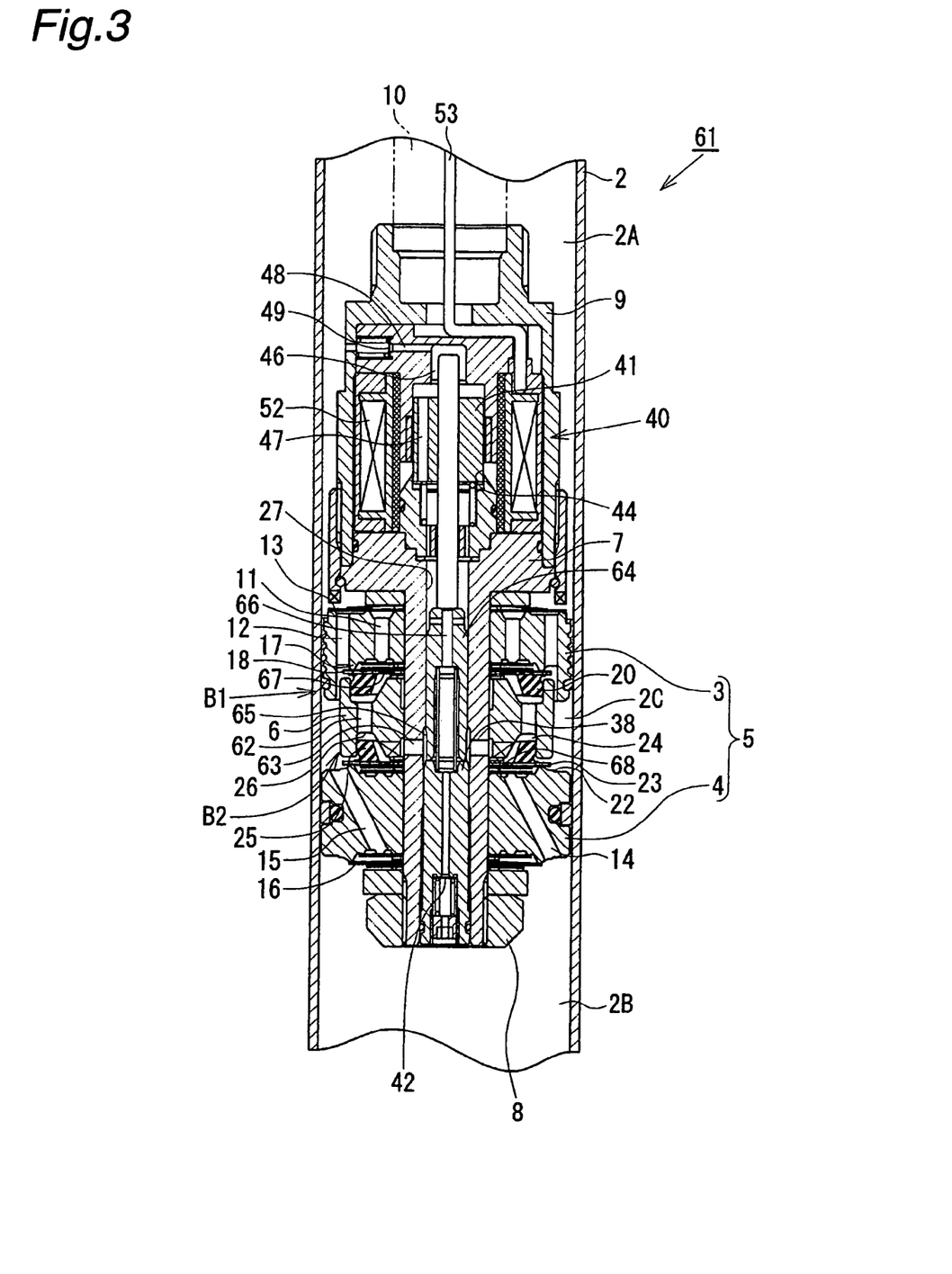
FIG. 3 is a vertical sectional view illustrating main parts of a damping force adjustable hydraulic shock absorber of a third embodiment of the present invention.

As shown in FIG. 3, in a damping force adjustable hydraulic shock absorber 61 of the third embodiment, extension-side and compression-side backpressure chambers 19 and 24 are in communication with each other through an oil passage 62 provided in a valve member 6, and are further in communication with a guide bore 27 through a common port 63. A single valve body 64, which is a common valve shared by the extension-side and the compression-side, is fitted in the guide bore 27. While a back end side of the valve body 64 is configured to be fitted in the guide bore 27, a front end side of the valve body 64 has a smaller diameter than that of the back end side, whereby an annular chamber 65 in communication with the port 63 is defined between the valve body 64 and a side wall of the guide bore 27, and a pressure receiving surface which receives a pressure of the annular chamber 65 is formed on the front end side of the valve body 64. When the front end of the valve body 64 moves away from or is seated on an annular seat portion 38, communication between the annular chamber 65 and a communication passage 66 extending along an axis of the valve body 64, and communication between the annular chamber 65 and a check valve 42 are established or cut off (opened or closed).

The extension-side backpressure chamber 19 is in communication with an extension-side oil passage 11 through an orifice oil passage 67 provided at an extension-side main valve 18. The compression-side backpressure chamber 24 is in communication with a compression-side oil passage 14 through an orifice oil passage 68 provided at a compression-side main valve 23. The compression-side backpressure chamber 24 has a smaller diameter than that of the extension-side backpressure chamber 19. Therefore, a pressure-receiving area where the compression-side main valve 23 receives a pressure from the compression-side backpressure chamber 24 is smaller than a pressure-receiving area where the extension-side main valve 18 receives a pressure from the extension-side backpressure chamber 19.

The hydraulic shock absorber 61 configured as described above works as follows. During an extension-stroke of a piston rod 10, until the extension-side main valve 18 is opened, oil of a cylinder upper chamber 2A side flows through the extension-side oil passage 11, the orifice oil passage 67, the extension-side backpressure chamber 19, the oil passage 62, the compression-side backpressure chamber 24 and the port 63 into the annular chamber 65, opens the valve body 64, and then flows through the check valve 42 into a cylinder lower chamber 2B. Once the pressure of the cylinder upper chamber 2A side reaches a valve-opening pressure of the extension-side main valve 18, the main valve 18 is opened and then the oil in the extension-side oil passage 11 starts to flow through a piston chamber 2C and a piston oil passage 15 of a second piston 4, opens an extension-side check valve 16 and flows into the cylinder lower chamber 2B.

Controlling a current to be applied to a coil 52 of a solenoid actuator 40 enables adjustment of a valve-opening pressure of the valve body 64. This adjustment enables direct control of an oil flow from the annular chamber 65 to the check valve 42, whereby it becomes possible to adjust the damping force. At the same time, since controlling an oil flow from the chamber 65 to the valve 42 enables adjustment of a pressure of the extension-side backpressure chamber 19, it becomes possible to control the valve-opening pressure of the extension-side main valve 18.

During a compression stroke of the piston rod 10, until the compression-side main valve 23 is opened, oil of the cylinder lower chamber 2B side flows through the compression-side oil passage 14, the orifice oil passage 68, the compression-side backpressure chamber 24, the port 63 into the annular chamber 65, opens the valve member 64, and then flows through the communication passage 66, a plunger bore 44, an oil passage 47 of the plunger 41, an oil chamber 46, an oil passage 48 and a check valve 49 into the cylinder upper chamber 2A. Once the pressure of the cylinder lower chamber 2B side reaches a valve-opening pressure of the compression-side main valve 23, the main valve 23 is opened and then the oil in the compression-side oil passage 14 starts to flow through the piston chamber 2C and a piston oil passage 12 of a first piston 3, opens a compression-side check valve 13 and flows into the cylinder upper chamber 2A.

Controlling a current to be applied to the coil 52 of the solenoid actuator 40 enables adjustment of the valve-opening pressure of the valve body 64. This adjustment enables direct control of an oil flow from the annular chamber 65 to the communication passage 66, whereby it becomes possible to adjust the damping force. At the same time, since controlling an oil flow from the chamber 65 to the communication passage 66 enables adjustment of a pressure of the compression-side backpressure chamber 24, it becomes possible to control the valve-opening pressure of the compression-side main valve 23.

In this way, it is possible to adjust the extension-side damping force and the compression-side damping force at the same time with use of a single valve body 64. In the third embodiment, the compression-side backpressure chamber 24 has a smaller diameter than that of the extension-side backpressure chamber 19. That is, because the pressure-receiving area where the compression-side main valve 23 receives a pressure from the compression-side backpressure chamber 24 is smaller than the pressure-receiving area where the extension-side main valve 18 receives a pressure from the extension-side backpressure chamber 19, it is possible to set a smaller opening-valve pressure of the compression-side main valve 23 than that of the extension-side main valve 18.

Similarly to the before-discussed first embodiment, because the extension-side and compression-side check valves 16 and 13 are respectively positioned on downstream sides of the extension-side and compression-side main valves 18 and 23, the compression-side check valve 13 prevents an increased pressure of the cylinder upper chamber 2A side from acting on the compression-side main valve 23 during an extension stroke of the piston rod 10, and the extension-side check valve 16 prevents an increased pressure of the cylinder lower chamber 2B side from acting on the extension-side main valve 18 during a compression stroke of the piston rod 10. Therefore, regardless of piston speed, it is possible to generate a stable damping force and enhance durability of the extension-side and compression-side main valves.

In the above-discussed first to third embodiments, the piston chamber 2C is defined by two pistons, i.e., the first and second pistons 3 and 4, and the side wall of the cylinder 2. In other embodiments, the piston chamber 2C may be formed inside a single piston. The above-discussed first to third embodiments include the extension-side damping valve B1 and the compression-side damping valve B2 provided at the piston portion. In other embodiments, the damping valves B1, B2 may be provided at a portion other than a piston portion, including the outside of a cylinder, as long as it is positioned on a passage through which a fluid flow is caused by a sliding movement of a piston in the cylinder.

In the above-discussed first to third embodiments, the hydraulic shock absorber generates a damping force by controlling an oil flow. However, this does not limit the present invention, and the hydraulic shock absorber may generate a damping force by controlling a flow of another kind of fluid such as a gas.

In the above-discussed first to third embodiments, the compression-side check valve 13 and the extension-side check valve 16 do not have a set load and therefore a pressure in the piston chamber 2C is the same as that in a cylinder chamber on a downstream side. In other embodiments, a slight initial load may be set to the compression-side check valve 13 and/or the extension-side check valve 16 so that the piston chamber 2C contains a slightly higher pressure than that in a cylinder chamber on a downstream side, whereby it is possible to stabilize a pressure of the piston chamber 2C, and therefore damping force characteristics.

As described above, according to the embodiments of the present invention, the extension-side check valve prevents a fluid pressure from acting on the extension-side main valve during a compression stroke of the piston rod, and the compression-side check valve prevents a fluid pressure from acting on the compression-side main valve during an extension stroke of the piston rod. Therefore, it is possible to generate a stable damping force and enhance durability of the extension-side and compression-side main valves.

Further, the extension-side main valve and the extension-side check valve are in communication with each other, and the compression-side main valve and the compression-side check valve are in communication with each other. Therefore, it is possible to maintain low pressures on downstream sides of the main valves, and thereby obtain a stable damping force.

Further, valve opening of the extension-side main valve or the compression-side main valve is controlled by controlling a fluid introduced or being introduced into the extension-side backpressure chamber or the compression-side backpressure chamber with use of the damping force adjuster, whereby it is possible to adjust damping force characteristics.

Further, the valve-opening pressure of the extension-side main valve or the compression-side main valve is controlled by controlling a pressure introduced or being introduced into the extension-side backpressure chamber or the compression-side backpressure chamber with use of the damping force adjuster, whereby it is possible to adjust damping force characteristics.

Further, it is possible to generate a damping force by means of a disk valve.

Further, the extension-side check valve prevents a fluid pressure from acting on the packing of the extension-side main valve during a compression stroke of the piston rod, and the compression-side check valve prevents a fluid pressure from acting on the packing of the compression-side main valve during an extension stroke of the piston rod.

Further, the extension-side and compression-side check valves prevent fluid pressures from acting on the extension-side and compression-side main valves in the piston chamber.

According to the third embodiment of the present invention, the extension-side backpressure chamber and the compression-side backpressure chamber are in communication with each other, whereby a simple structure is realized. In addition, it is possible to adjust a damping force in an extension stroke and a damping force in a compression stroke by use of the single damping force adjuster, if the damping force adjuster is provided.

Further, the pressure-receiving area of the extension-side backpressure chamber is different from the pressure-receiving area of the compression-side backpressure chamber. Therefore, even with the extension-side backpressure chamber and the compression-side backpressure chamber in communication with each other, it is possible to obtain different damping force characteristics between the extension-side and the compression-side, whereby flexibility in setting a damping force is enhanced.

According to the first and third embodiments of the present invention, the valve member for defining the extension-side and the compression-side backpressure chambers are provided, whereby it is possible to reduce components required to form the valve.

According to another embodiment of the present invention, an initial load is set to at least one of the extension-side check valve and the compression-side check valve, whereby it is possible to gradually reduce the pressure.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-111048, filed on Apr. 19, 2007. The entire disclosure of Japanese Patent Applications No. 2007-111048 including specification, claims, drawings and summary is incorporated herein by reference in its entirety.

The Japanese Patent Application Public Disclosure No. 2005-344911 are incorporated herein by reference in its entirety.

What is claimed is:

1. A fluid pressure shock absorber, comprising:
 a cylinder in which a fluid is sealingly contained;
 a piston slidably fitted in the cylinder, the piston dividing the interior of the cylinder into a first chamber and a second chamber;
 a piston rod having one end coupled to the piston and the other end extending to an outside of the cylinder;
 a piston chamber formed in the piston;
 an extension-side oil passage formed in the piston so as to establish communication between the first chamber and the piston chamber;
 a compression-side oil passage formed in the piston so as to establish communication between the second chamber and the piston chamber;
 an extension-side piston oil passage formed in the piston so as to establish communication between the second chamber and the piston chamber;
 a compression-side piston oil passage formed in the piston so as to establish communication between the first chamber and the piston chamber;
 an extension-side check valve disposed on the second chamber side of the extension-side piston oil passage so as to allow a flow of fluid from the piston chamber to the second chamber;
 a compression-side check valve disposed on the first chamber side of the compression-side piston oil passage so as to allow a flow of fluid from the piston chamber to the first chamber;
 an extension-side main valve disposed within the piston and disposed on the piston chamber side of the extension-side oil passage;
 an extension-side backpressure chamber containing an inner pressure which acts on the extension-side main valve in a valve-closing direction of the extension-side main valve;
 a compression-side main valve disposed within the piston and disposed on the piston chamber side of the compression-side oil passage; and
 a compression-side backpressure chamber containing an inner pressure which acts on the compression-side main valve in a valve-closing direction of the compression-side main valve, wherein:
 the piston chamber is separated from the first chamber and the second chamber by the extension-side main valve, the compression-side check valve, the compression-side main valve, and the extension-side check valve,
 parts of the fluid flows are introduced into the extension-side backpressure chamber and the compression-side backpressure chamber, and opening of the extension-side main valve and the compression-side main valve is controlled by utilizing the inner pressures of the extension-side backpressure chamber and the compression-side backpressure chamber.

2. The fluid pressure shock absorber according to claim 1, wherein a first section between the extension-side main valve and the extension-side check valve and a second section between the compression-side main valve and the compression-side check valve are in communication with each other.

3. The fluid pressure shock absorber according to claim 1, further comprising a damping force adjuster which adjusts a damping force by controlling a fluid introduced or being introduced into at least one of the extension-side backpressure chamber and the compression-side backpressure chamber.

4. The fluid pressure shock absorber according to claim 3, wherein the damping force adjuster comprises a pressure control valve for adjusting a pressure in at least one of the extension-side backpressure chamber and the compression-side backpressure chamber.

5. The fluid pressure shock absorber according to claim 1, wherein at least one of the extension-side main valve and the compression-side main valve comprises a disk valve.

6. The fluid pressure shock absorber according to claim 5, wherein a plastic packing for sealing the extension-side backpressure chamber or the compression-side backpressure chamber is fixedly attached to the disk valve.

7. The fluid pressure shock absorber according to claim 1, wherein:
 the piston comprises two pistons fixed to the piston rod and the piston chamber is formed between the two pistons.

8. The fluid pressure shock absorber according to claim 3, wherein the extension-side backpressure chamber and the compression-side backpressure chamber are in communication with each other.

9. The fluid pressure shock absorber according to claim 8, wherein pressure-receiving areas of the extension-side backpressure chamber and the compression-side backpressure chamber are different from each other.

10. The fluid pressure shock absorber according to claim 7, further comprising a valve member defining the extension-side backpressure chamber and the compression-side backpressure chamber between the two pistons.

11. The fluid pressure shock absorber according to claim 1, an initial load is set to at least one of the extension-side check valve and the compression-side check valve.

12. The fluid pressure shock absorber according to claim 2, further comprising a damping force adjuster which adjusts a damping force by controlling a fluid introduced or being introduced into at least one of the extension-side backpressure chamber and the compression-side backpressure chamber.

13. The fluid pressure shock absorber according to claim 12, wherein the damping force adjuster comprises a pressure control valve for adjusting a pressure in at least one of the extension-side backpressure chamber and the compression-side backpressure chamber.

14. The fluid pressure shock absorber according to claim 2, wherein at least one of the extension-side main valve and the compression-side main valve comprises a disk valve.

15. The fluid pressure shock absorber according to claim 14, wherein a plastic packing for sealing the extension-side backpressure chamber or the compression-side backpressure chamber is fixedly attached to the disk valve.

16. The fluid pressure shock absorber according to claim 2, wherein the piston comprises two pistons fixed to the piston rod and the piston chamber is formed between the two pistons.

17. The fluid pressure shock absorber according to claim 12, wherein the extension-side backpressure chamber and the compression-side backpressure chamber are in communication with each other.

18. The fluid pressure shock absorber according to claim 17, wherein pressure-receiving areas of the extension-side backpressure chamber and the compression-side backpressure chamber are different from each other.

19. The fluid pressure shock absorber according to claim 16, further comprising a valve member defining the extension-side backpressure chamber and the compression-side backpressure chamber between the two pistons.

20. The fluid pressure shock absorber according to claim 2, an initial load is set to at least one of the extension-side check valve and the compression-side check valve.

21. The fluid pressure shock absorber according to claim 1, wherein:
    the piston comprises a first piston and a second piston;
    the extension-side main valve is seated on a lower end of the first piston; and
    the compression-side main valve is seated on an upper side of the second piston.

22. The fluid pressure shock absorber according to claim 2, wherein:
    the piston comprises a first piston and a second piston;
    the extension-side main valve is seated on a lower end of the first piston; and
    the compression-side main valve is seated on an upper side of the second piston.

\* \* \* \* \*